United States Patent
Füllgrabe et al.

(10) Patent No.: US 9,963,135 B2
(45) Date of Patent: May 8, 2018

(54) VALVE UNIT FOR MODULATING THE PRESSURE IN A PNEUMATIC BRAKE SYSTEM

(71) Applicant: WABCO GmbH, Hannover (DE)

(72) Inventors: Dirk Füllgrabe, Hohenhameln (DE); Stefan Knoke, Hannover (DE); Karsten Runge, Springe (DE); Andreas Teichmann, Isernhagen (DE)

(73) Assignee: WABCO GmbH, Hannover (DE)

( * ) Notice: Subject to any disclaimer, the term of this patent is extended or adjusted under 35 U.S.C. 154(b) by 0 days. days.

(21) Appl. No.: 15/305,520

(22) PCT Filed: Aug. 6, 2015

(86) PCT No.: PCT/EP2015/001629
§ 371 (c)(1),
(2) Date: Oct. 20, 2016

(87) PCT Pub. No.: WO2016/029995
PCT Pub. Date: Mar. 3, 2016

(65) Prior Publication Data
US 2017/0036654 A1    Feb. 9, 2017

(30) Foreign Application Priority Data
Aug. 27, 2014   (DE) .................. 10 2014 012 596

(51) Int. Cl.
*F15B 13/043*   (2006.01)
*B60T 8/36*     (2006.01)

(52) U.S. Cl.
CPC .......... *B60T 8/3675* (2013.01); *B60T 8/3605* (2013.01); *F15B 13/043* (2013.01); *F15B 13/0435* (2013.01)

(58) Field of Classification Search
USPC .................................................... 137/596.16
See application file for complete search history.

(56) References Cited

U.S. PATENT DOCUMENTS 3,977,734 A     8/1976   Rönnhult et al.
4,744,388 A *   5/1988   Ariizumi ............. F15B 13/0405
                                                    137/596.14

(Continued)

FOREIGN PATENT DOCUMENTS

DE    2517571 A1    10/1975
DE    2733883 C2    2/1978

(Continued)

OTHER PUBLICATIONS

European Patent Office, Rijswijk, Netherlands, International Search Report of International Application No. PCT/EP2015/001629 dated Oct. 13, 2015 (6 pages).

*Primary Examiner* — John Fox
(74) *Attorney, Agent, or Firm* — Brinks Gilson & Lione

(57) ABSTRACT

The invention relates to a valve unit for modulating the pressure in a pneumatic brake system, comprising a brake pressure inlet, a brake pressure outlet, a vent outlet, a diaphragm inlet valve, a diaphragm outlet valve, and a pilot valve for each diaphragm valve, the pilot valves being arranged in an elongate valve housing (having a main housing and a housing cover. The inlet valve pilot valve and the outlet valve pilot valve are arranged substantially centrally above the diaphragms of the inlet valve and the outlet valve in the housing cover and with the actuation axes of the pilot valves running parallel to the parting plane, and the housing cover includes a central insert which has valve bores and control channels and into which the solenoids and the mechanical components of the pilot valves are inserted, the central insert being encapsulated with a plastic material.

14 Claims, 6 Drawing Sheets

(56) References Cited

U.S. PATENT DOCUMENTS

| | | | | | |
|---|---|---|---|---|---|
| 4,787,415 | A | * | 11/1988 | Teltscher | F15B 13/0405 137/596.15 |
| 5,100,208 | A | * | 3/1992 | Angermair | B60T 8/36 303/118.1 |
| 6,062,260 | A | * | 5/2000 | Yoshimura | F15B 13/0405 137/596.14 |
| 6,415,818 | B2 | * | 7/2002 | Dickman | F16K 31/402 137/596.16 |
| 7,905,557 | B2 | * | 3/2011 | Frank | B60T 8/327 137/613 |
| 8,869,831 | B2 | * | 10/2014 | Haehn | B60T 8/361 137/596.16 |

FOREIGN PATENT DOCUMENTS

| | | | |
|---|---|---|---|
| DE | 2224274 | C3 | 5/1981 |
| DE | 3408123 | A1 | 9/1985 |
| DE | 3825549 | A1 | 2/1990 |
| DE | 4005608 | A1 | 9/1991 |
| DE | 4008095 | A1 | 9/1991 |
| DE | 102008028439 | B3 | 10/2009 |
| EP | 0439303 | A1 | 7/1991 |
| EP | 0498584 | B1 | 8/1992 |
| EP | 0539770 | A1 | 5/1993 |
| WO | 2008/034524 | A1 | 3/2008 |

\* cited by examiner

VALVE UNIT FOR MODULATING THE PRESSURE IN A PNEUMATIC BRAKE SYSTEM

TECHNICAL FIELD

The invention relates to a valve unit for modulating the pressure in a pneumatic brake system. A valve unit or pneumatic brake system of this kind can be provided for installation in a motor vehicle, for example.

BACKGROUND OF THE INVENTION

In pneumatic antilock brake systems of wheeled vehicles, such as motor vehicles and rail vehicles, that is to say pneumatic brake systems fitted with an antilock system, a valve unit for modulating the pressure is arranged in each of the brake lines leading from a brake valve to the wheel brake cylinders. This valve unit has an inlet valve and an outlet valve. By the inlet valve, a brake pressure outlet can be either connected to a brake pressure inlet or shut off from the latter. The brake pressure outlet is connected to a brake line segment leading to at least one wheel brake cylinder, and a brake line segment coming from the brake valve is connected to the brake pressure inlet. By the outlet valve, the brake pressure outlet can either be connected to a vent outlet or shut off from the latter, said vent outlet usually leading to the environment via a muffler.

Owing to the large flow volumes to be switched and correspondingly large path cross sections to be opened and closed, the inlet valve and the outlet valve are often designed as pneumatically actuable diaphragm valves, which can be controlled by a respective pilot valve designed as a 3/2-way solenoid valve. A diaphragm valve has a flexible diaphragm substantially in the form of a circular disk, which is clamped at its edge in a valve housing. Arranged on the axial inner side of the diaphragm, where the flow channels connected to the compressed air inlets and compressed air outlets are arranged, are a central circular valve seat of a cylindrical inner flow channel and an annular outer flow channel arranged concentrically with the inner flow channel. Arranged on the axially opposite outer side of the diaphragm is a control chamber, which can be supplied by the associated pilot valve either with a high control pressure generally taken from the brake pressure inlet or with a low control pressure (ambient pressure) generally taken from the vent outlet.

When the control chamber is supplied with the high control pressure, the diaphragm is pressed against the valve seat, whereby the inner flow channel is shut off from the outer flow channel, this corresponding to the closed state of the relevant diaphragm valve. When the control chamber is supplied with the low control pressure, the diaphragm, which generally rests automatically on the valve seat by virtue of its shape, is raised from the valve seat by the brake pressure prevailing in the flow channels and is moved in the direction of the control chamber, whereby the inner flow channel is connected to the outer flow channel, this corresponding to the open state of the relevant diaphragm valve.

A valve unit of this kind has the operating functions of "pressure buildup", "pressure maintenance" and "pressure reduction". In the operating function of "pressure buildup" of the valve unit, the inlet valve is open and the outlet valve is closed, with the result that the brake pressure fed in at the brake pressure inlet via the brake valve is transmitted unchanged to the brake pressure outlet and to at least one wheel brake cylinder connected thereto. Since the operating function of "pressure buildup" corresponds to the state of rest of the valve unit, the pilot valve of the inlet valve connects the control chamber of the inlet valve to a control line carrying the low control pressure when the solenoid of said pilot valve is in the deenergized state. The pilot valve of the outlet valve likewise connects the control chamber of the outlet valve to a control line carrying the high control pressure when the solenoid of said pilot valve is in the deenergized state.

In the operating function of "pressure maintenance" of the valve unit, the inlet valve and the outlet valve are closed, with the result that the brake pressure applied to the brake pressure outlet and the at least one wheel brake cylinder connected thereto is then held constant. To set this operating function, only the pilot valve of the inlet valve is switched over by energizing its solenoid, thus supplying the control chamber of the inlet valve with the high control pressure. In the operating function of "pressure reduction" of the valve unit, the inlet valve is closed and the outlet valve is open, with the result that the brake pressure outlet and the at least one wheel brake cylinder connected thereto are then vented to the environment. To set this operating function, both pilot valves are switched over by energizing their solenoids, thus supplying the control chamber of the inlet valve with the high control pressure and the control chamber of the outlet valve with the low control pressure.

The operating functions of "pressure maintenance" and "pressure reduction" of the valve unit are antilock functions, by which braking-induced locking of the at least one associated wheel is supposed to be avoided. These operating functions are controlled by corresponding control of the pilot valves by a control unit of an antilock system, in which the signals from wheel speed sensors are evaluated to detect imminent or already existing locking of the braked wheels.

With regards to the geometrical arrangement of the compressed air inlets and compressed air outlets of the inlet and outlet valves designed as diaphragm valves and of the pilot valves designed as solenoid valves in a valve housing, different embodiments of valve units are known.

In DE 22 24 274 C3, there is a description of a valve unit in which, in the installed position, the brake pressure inlet is arranged horizontally and the brake pressure outlet and the vent outlet are arranged so as to be aligned vertically downward in the valve housing. The inlet valve is arranged in the valve housing adjacent to the brake pressure inlet with its actuation axis aligned vertically and its diaphragm aligned horizontally, whereas the outlet valve is arranged horizontally opposite in the valve housing with its actuation axis aligned horizontally and its diaphragm aligned vertically. The pilot valve of the inlet valve is arranged in the valve housing above the diaphragm of the inlet valve, with its actuation axis aligned horizontally, whereas the pilot valve of the outlet valve is arranged with its actuation axis aligned vertically, between the diaphragm of the outlet valve and a vertical outer wall of the valve housing.

DE 40 05 608 A1, on the other hand, discloses a valve unit in which, in the installed position, the brake pressure inlet and the brake pressure outlet are arranged axially opposite in horizontal alignment and the vent outlet is arranged in horizontal alignment above the brake pressure outlet in the valve housing. The inlet valve is arranged approximately centrally below the brake pressure inlet and the brake pressure outlet in the valve housing, with its actuation axis aligned vertically and its diaphragm aligned horizontally, whereas the outlet valve is arranged centrally above the vent outlet in the valve housing, with its actuation axis aligned vertically and its diaphragm aligned horizontally. The pilot valve of the inlet valve is arranged in the valve housing with its actuation axis aligned horizontally, below the diaphragm of the inlet valve, whereas the pilot valve of the outlet valve is arranged centrally above the diaphragm of the outlet valve in the valve housing, with its actuation axis aligned vertically.

In another valve unit in accordance with DE 40 08 095 A1, in the installed position the brake pressure inlet and the brake pressure outlet are arranged in a horizontal alignment in the valve housing, likewise substantially axially opposite one another, but the vent outlet is arranged approximately centrally and aligned vertically downward in the valve housing. The inlet valve is arranged in the valve housing substantially centrally above the brake pressure inlet and the brake pressure outlet, with its actuation axis aligned vertically and its diaphragm aligned horizontally, whereas the outlet valve is arranged in the valve housing below the brake pressure outlet, with its actuation axis aligned vertically and its diaphragm aligned horizontally. The pilot valve of the inlet valve and the pilot valve of the outlet valve are then arranged in the valve housing with their respective actuation axes aligned vertically and with opposite switching directions, below the brake pressure inlet and radially adjacent to one another.

DE 34 08 123 A1 describes two embodiments of valve units. A first embodiment of the valve unit in accordance with FIG. 1 of that document corresponds to a large extent to the valve unit described above with reference to DE 40 08 095 A1. In a second valve unit in accordance with FIG. 2 of that document, in an installed position the brake pressure inlet and the brake pressure outlet are arranged to a large extent axially opposite one another in horizontal alignment in the valve housing, but the brake pressure outlet is arranged lower than the brake pressure inlet in the valve housing. The vent outlet is arranged approximately centrally and aligned vertically downward in the valve housing. The inlet valve and the outlet valve are arranged approximately at the level of the brake pressure inlet and the brake pressure outlet, with their actuation axes aligned horizontally and their diaphragms aligned vertically, at right angles to the brake pressure inlet and the brake pressure outlet, at offset heights relative to one another and axially opposite one another. The pilot valve of the inlet valve and the pilot valve of the outlet valve are arranged in the valve housing with their respective actuation axes aligned vertically and with opposite switching directions, below the respectively associated diaphragm valve.

In the installed position in another valve unit, known from DE 38 25 549 A1, the brake pressure inlet and the brake pressure outlet are arranged axially opposite one another in horizontal alignment in the valve housing, and the vent outlet is arranged above the brake pressure inlet in horizontal alignment in the valve housing. The inlet valve is arranged above the brake pressure inlet in the valve housing, with its actuation axis aligned horizontally and its diaphragm aligned vertically, whereas the outlet valve is arranged above the brake pressure outlet in the valve housing, coaxially with the inlet valve, with its actuation axis aligned horizontally and its diaphragm aligned vertically. The pilot valve of the inlet valve and the pilot valve of the outlet valve are arranged radially adjacent to one another, largely centrally above the diaphragms of the inlet valve and of the outlet valve, in the valve housing, with their respective actuation axes aligned horizontally and with opposite switching directions.

By virtue of the arrangement of the compressed air inlets and compressed air outlets, of the inlet valves and outlet valves and of the pilot valves, a multi-part embodiment and expensive mechanical machining of the valve housing are required with the abovementioned valve units. Especially the respective arrangement of the diaphragms of the inlet valve and of the outlet valve in different diaphragm planes requires repeated re-clamping of the housing parts for mechanical machining of the valve seats and of the channel edges or chamber edges between which the diaphragms are clamped. To reduce the production outlay, there have therefore already been proposals for valve units in which the diaphragm valves are arranged with parallel actuation axes and arrangement of the diaphragms in a common diaphragm plane corresponding largely to a parting plane between two housing parts.

A valve unit of this kind is described in DE 25 17 571 A1, for example. In this known valve unit, an elongate valve housing is subdivided by a parting plane that is horizontal in the installed position into a housing bottom part and a housing top part. The brake pressure inlet and the vent outlet are arranged in the longitudinal direction in horizontal alignment and substantially axially opposite in the housing bottom part, and the brake pressure outlet is arranged to a large extent centrally and at right angles thereto in the housing bottom part, likewise in horizontal alignment. The diaphragm valves are arranged in series in the longitudinal direction in the housing bottom part, between the brake pressure inlet and the vent outlet, with parallel actuation axes and arrangement of the diaphragms in a common diaphragm plane largely corresponding to the parting plane, being clamped between the housing bottom part and the housing top part in the longitudinal direction of the valve housing. The pilot valve of the inlet valve and the pilot valve of the outlet valve are each arranged radially adjacent to one another, above the respectively associated diaphragm valve, in the housing top part, with their respective actuation axes aligned vertically and the same switching directions, with the result that the overall height of the housing top part and hence of the valve unit as a whole is relatively large.

In another valve unit of this kind, which is known from EP 0 498 584 B1, the valve housing is subdivided by a parting plane that is vertical in the installed position into an inlet housing and an outlet housing. The brake pressure inlet is arranged in horizontal alignment at the top of the inlet housing. The brake pressure outlet is arranged in horizontal alignment, to a large extent axially opposite the brake pressure inlet, in the outlet housing, whereas the vent outlet is arranged in vertically downward alignment in the outlet housing. The diaphragm valves are arranged in the outlet housing between the brake pressure outlet and the vent outlet with parallel actuation axes and arrangement of the diaphragms in a common diaphragm plane corresponding largely to the parting plane, being arranged vertically one above the other and being clamped between the outlet housing and the inlet housing. The pilot valve of the inlet valve and the pilot valve of the outlet valve are arranged radially adjacent to one another in the inlet housing, with their respective actuation axes aligned horizontally and opposite switching directions, approximately centrally and at right angles to the compressed air inlets and compressed air outlets and parallel to the parting plane. The solenoids of the pilot valves are arranged in a magnet block, which is arranged, together with the mechanical components used in the solenoid valves, between a housing top part and a housing bottom part of the inlet housing. To ensure sealing, seals or sealing rings are arranged between the magnet block, the valve blocks and the valve seats of the solenoid valves, on the one hand, and the housing top part and housing bottom part of the inlet housing, on the other hand. To fix the housing top part and the housing bottom part to the magnet block of the solenoid valves, on the one hand, and to clamp the diaphragms of the diaphragm valves, on the other hand, the housing top part and the housing bottom part of the inlet housing are each screwed to the outlet housing. Thus, the valve unit comprises a very large number of components, which are relatively difficult to assemble. The production and assembly of this known valve unit is therefore relatively complicated and expensive.

Finally, DE 10 2008 028 439 B3 describes a valve unit of this kind in which an elongate valve housing is subdivided into a housing bottom part, a housing top part and an intermediate plate arranged therebetween, with parting planes that are largely horizontal in the installed position. The brake pressure inlet, the brake pressure outlet, and the vent outlet are each arranged in horizontal alignment in the housing bottom part. The diaphragm valves are arranged in series in the longitudinal direction in the housing bottom part, with parallel actuation axes and arrangement of the diaphragms in a common diaphragm plane corresponding to a large extent to the parting plane between the housing bottom part and the intermediate plate, being clamped between the housing bottom part and the intermediate plate. The pilot valve of the inlet valve and the pilot valve of the outlet valve are arranged radially adjacent to one another, approximately centrally above the diaphragm valves, in the housing top part, with their respective actuation axes aligned vertically and with the same switching directions, with the result that the overall height of the housing top part and hence of the valve unit as a whole is relatively large. The intermediate plate is screwed to the housing bottom part. The housing top part is screwed to the intermediate plate or the housing bottom part via an outer cover. Seals are arranged in the parting plane between the housing top part and the intermediate plate. This valve unit too thus comprises a very large number of components, although they can be assembled in a relatively simple manner from above. However, the production and assembly of this known valve unit are regarded as relatively expensive.

SUMMARY

Therefore the present invention provides a valve unit for modulating the pressure in a pneumatic brake system, which unit is compact and constructed from a small number of components and has good control properties, in particular short switching times of the diaphragm valves.

This object has been achieved by virtue of the fact that the pilot valve of the inlet valve and the pilot valve of the outlet valve are arranged in the longitudinal direction in the housing cover, largely centrally above the diaphragms of the inlet valve and the outlet valve, and with their actuation axes aligned parallel to the parting plane of the valve housing, and that the cover of the valve housing has a central insert, which has valve bores and control channels and into which the solenoids and the mechanical components of the pilot valves are inserted, said insert being encapsulated with a plastic material.

Accordingly, the invention includes a valve unit for modulating the pressure in a pneumatic brake system, said valve unit having a brake pressure inlet, a brake pressure outlet, a vent outlet, an inlet valve designed as a diaphragm valve, an outlet valve designed as a diaphragm valve, and a pilot valve designed as a 3/2-way solenoid valve for each of the two diaphragm valves. The compressed air inlets and compressed air outlets and the diaphragm valves and solenoid valves are arranged in an elongate valve housing, which is subdivided by a parting plane, which is largely horizontal in the installed position, into a main housing and a housing cover. The brake pressure inlet, the brake pressure outlet, and the vent outlet are arranged in the main housing. The diaphragm valves are arranged in series in the longitudinal direction in the main housing, between the brake pressure inlet and the brake pressure outlet, with parallel actuation axes and arrangement of the diaphragms in a common diaphragm plane corresponding largely to the parting plane, being clamped between the main housing and the housing cover. In contrast, the pilot valves are arranged in the housing cover.

According to the invention, it is additionally envisaged in this valve unit that the pilot valve of the inlet valve and the pilot valve of the outlet valve are arranged in the longitudinal direction in the housing cover, largely centrally above the diaphragms of the inlet valve and the outlet valve, and with their actuation axes aligned parallel to the parting plane, and that the housing cover has a central insert, which is provided with valve bores and control channels and into which the solenoids and the mechanical components of the pilot valves, such as the respective valve core, the respective valve armature and the respective valve spring, are inserted, said insert being encapsulated with a plastic material.

By virtue of the recumbent arrangement of the pilot valves, i.e. arrangement parallel to the parting plane of the valve housing in the longitudinal direction, in the installed position of the valve unit, the overall height of the valve cover is very low and hence the dimensions of the overall valve unit are particularly compact. This is particularly advantageous since such valve units are arranged as close as possible to the associated wheel brake cylinders in order to achieve a short response time in the relevant wheel brakes when controlling the antilock functions, and the installation space available there is generally small. By virtue of the encapsulation of the insert containing the solenoids and the mechanical components of the pilot valves, the assembly of the valve unit and inspection thereof, during which, in particular, the diaphragms of the inlet valve and of the outlet valve are replaced by new ones, are significantly simplified. Moreover, the two solenoid valves are particularly well-protected against damaging environmental influences from outside by being arranged in the insert.

The pilot valves can be designed as separate solenoid valves, which are arranged axially parallel and radially adjacent to one another in the insert with opposite switching directions and in each case a valve seat facing the respective diaphragm of the associated inlet or outlet valve. This alignment of the solenoid valves results, for both pilot valves, in particularly small pilot volumes to which air is to be admitted or from which it is to be released when switching over. This results in particularly short switching response times of the diaphragm valves when switching over the solenoid valves.

To simplify assembly, the insert consists, according to another embodiment, of two parts, which enclose the solenoids and the mechanical components of the solenoid valves at the ends.

A further easing of assembly and an improvement in the functioning of the pilot valves can be achieved if the mechanical components of the solenoid valves are each assembled in a valve cartridge.

As an alternative to individual embodiments of the solenoid valves, the pilot valves can be combined in a double armature solenoid valve having a common solenoid, in which the individual solenoid valves are arranged coaxially and axially adjacent to one another in the insert with opposite switching directions and in each case a valve seat facing the respective diaphragm of the associated inlet or outlet valve.

The solenoid of the double armature solenoid valve can be designed in such a way that it can be energized with a low and a high electric current, wherein the pilot valves are designed in such a way that the solenoid valve associated with the inlet valve is switched over by energization of the solenoid with the low current, whereas the solenoid valve associated with the outlet valve is switched over only when the solenoid is energized with the high current.

As an alternative, the solenoid of the double armature solenoid valve can have a central pickoff for partial energization, wherein the pilot valves are designed in such a way that the solenoid valve associated with the inlet valve is switched over by partial energization of the solenoid, whereas the solenoid valve associated with the outlet valve is switched over only by full energization of the solenoid.

The abovementioned switching characteristic of the double armature solenoid valve is largely achieved by a valve spring with an appropriately low spring stiffness is chosen for the pilot valve associated with the inlet valve and a valve spring with an appropriately high spring stiffness is chosen for the pilot valve associated with the outlet valve.

With this embodiment of the pilot valves too, in order to simplify assembly the insert preferably consists of two parts, which enclose the magnet coil and the mechanical components of the double armature solenoid valve at the ends. A further easing of assembly and an improvement in the functioning of the pilot valves can be achieved if the mechanical components of the double armature solenoid valve are assembled in a valve cartridge.

In the two cited variant embodiments of the pilot valves, in order to stabilize the housing cover, the insert of the housing cover preferably extends as far as the parting plane of the valve housing and at least partially delimits the control chambers of the diaphragm valves.

Since the control chambers of the diaphragm valves are supplied periodically with the high control pressure taken from the brake pressure inlet, there can be problems with leaktightness in the contact area between the insert and the encapsulation, close to the control chambers. However, such problems with leaktightness can be avoided or reduced if sealing elements are arranged in the housing cover between the insert and the encapsulation, at least in the vicinity of or near the control chambers of the solenoid valves. The sealing elements can be designed, for example, as sealing strips which are inserted into transverse grooves in the insert and, together with the insert, are encapsulated externally with the plastic material.

However, problems with leaktightness in the region of the control chambers of the diaphragm valves can also be avoided or reduced without additional expense if the insert of the housing cover extends as far as the parting plane of the valve housing and delimits the control chambers of the diaphragm valves, fully covering said chambers.

It is expedient if the connection cables of the solenoids are laid within the encapsulation of the housing cover and advantageously end in a connection socket formed integrally with the encapsulation. On the one hand, this means that the connection cables of the solenoids are protected in an optimum manner from damage. On the other hand, this gives the possibility of arranging the connection socket of the solenoids flexibly, i.e. with a different socket shape and a different alignment if required, at various locations on the housing cover in accordance with the requirements of the respective vehicle manufacturer.

Finally, provision can be made for the brake pressure inlet and the brake pressure outlet to be arranged largely axially opposite in horizontal alignment in the longitudinal direction, and the vent outlet to be arranged in vertically downward alignment therebetween, in the main housing.

Further aspects of the invention are explained in greater detail below by preferred illustrative embodiments with reference to the attached drawings. The drawings are provided for purely illustrative purposes and are not intended to limit the scope of the present invention.

BRIEF DESCRIPTION OF THE DRAWINGS

To further clarify the invention, drawings including a plurality of embodiments are attached to the description. In the drawings.

DETAILED DESCRIPTION OF THE DRAWINGS

Figure 1:
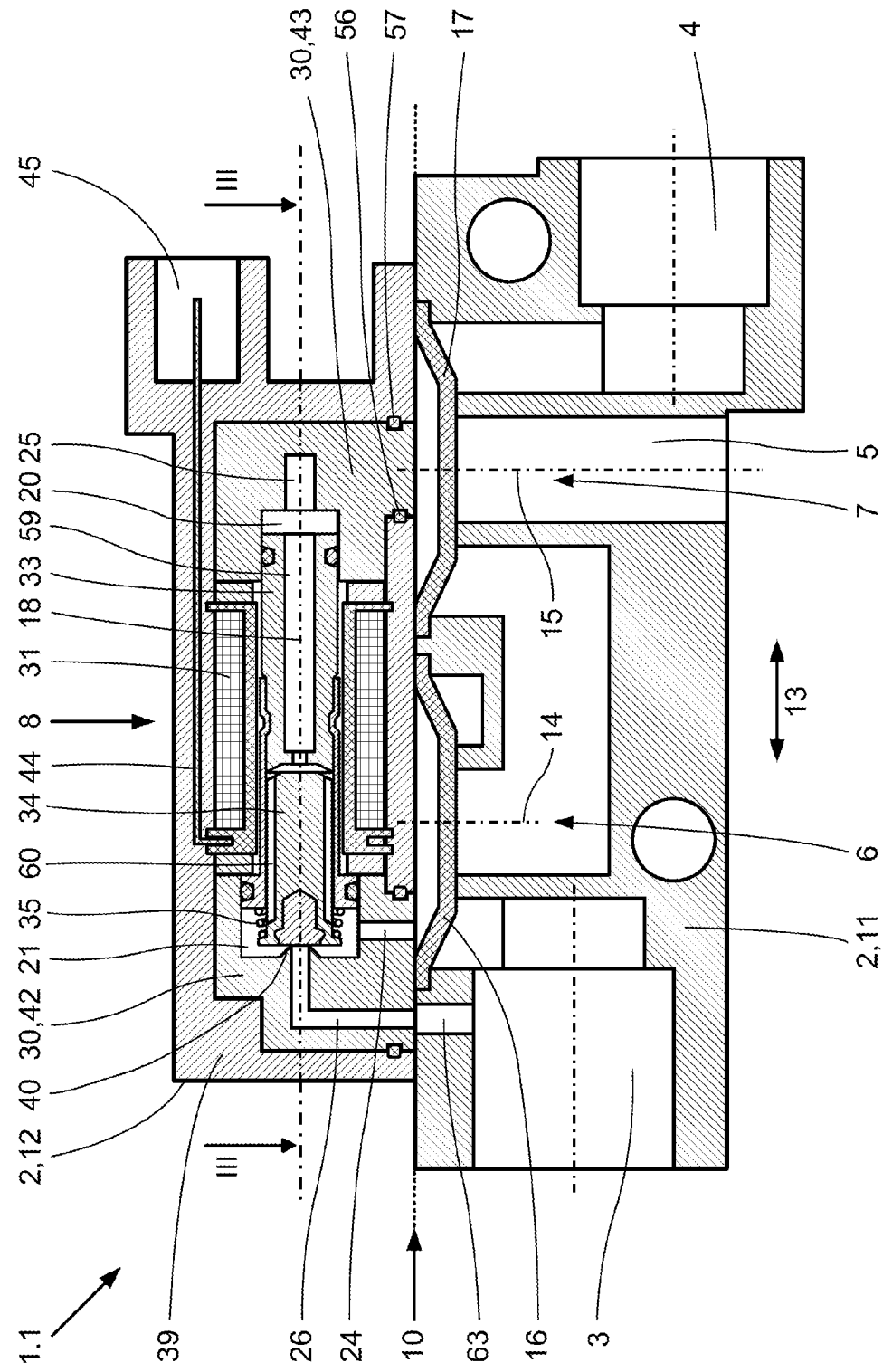
FIG. 1 shows a first embodiment of the valve unit according to the invention in a first vertical longitudinal section.
Figure 2:
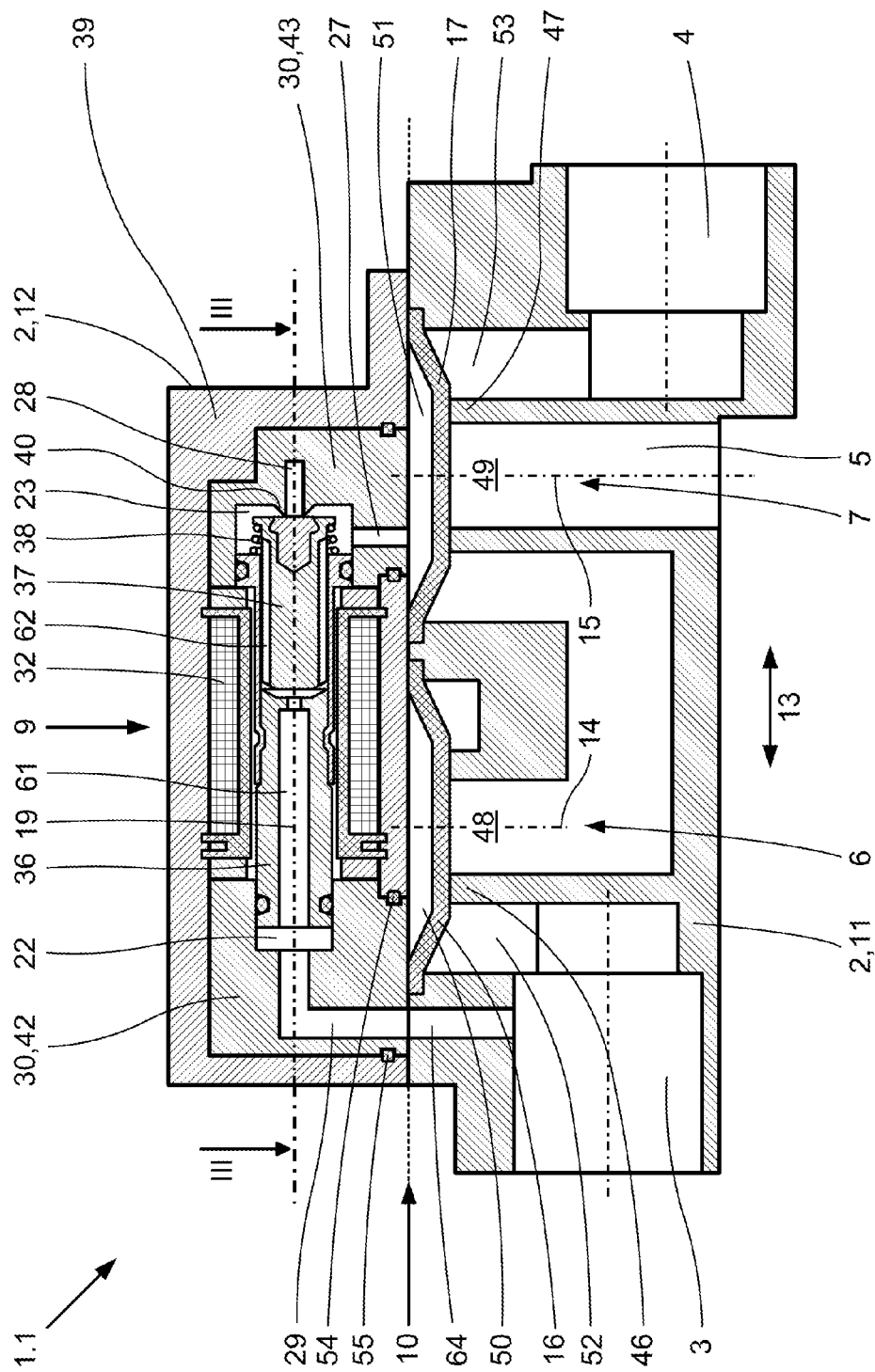
FIG. 2 shows the first embodiment of the valve unit in a second vertical longitudinal section.
Figure 3:
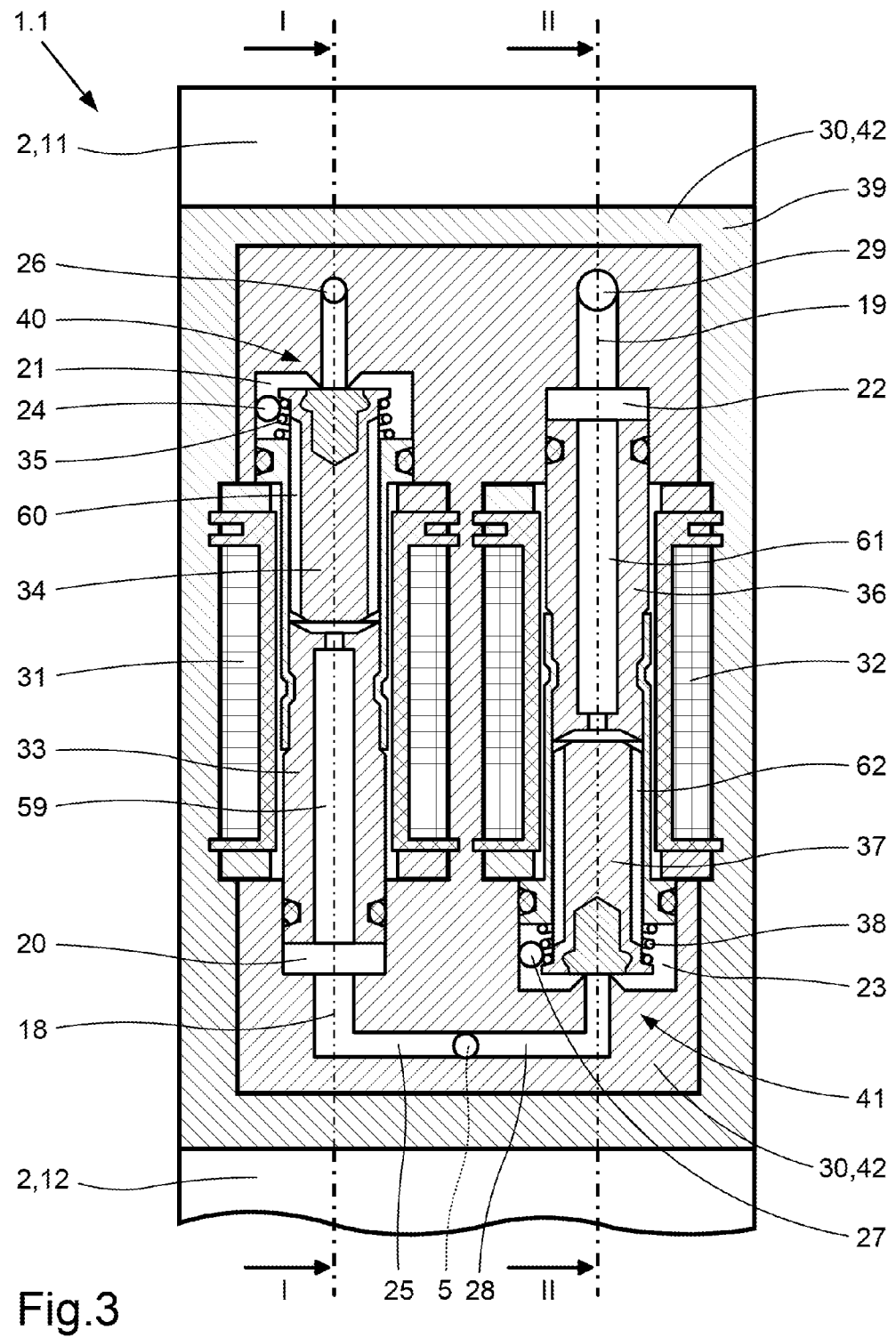
FIG. 3 shows the first embodiment of the valve unit in a horizontal section.

The first embodiment of the valve unit 1.1 according to the invention is depicted in a first vertical longitudinal section I-I according to FIG. 3 in FIG. 1, is shown in a second vertical longitudinal section II-II according to FIG. 3 in FIG. 2, and is shown in a horizontal section III-III according to FIG. 1 and FIG. 2 in FIG. 3.

A brake pressure inlet 3, a brake pressure outlet 4 and a vent outlet 5 are formed in an elongate valve housing 2. An inlet valve 6 designed as a diaphragm valve, an outlet valve 7 designed as a diaphragm valve, and a pilot valve 8, 9, designed as a 3/2-way solenoid valve, for each diaphragm valve 6, 7, are arranged in said valve housing 2. The valve housing 2 is subdivided by a parting plane 10, which is substantially horizontal in the installed position, into a main housing 11 and a housing cover 12, which can be connected to one another by a screwed flange joint or in some other way. The brake pressure inlet 3 and the brake pressure outlet 4 are arranged substantially axially opposite in horizontal alignment in the longitudinal direction 13 of the valve housing 2, and the vent outlet 5 is arranged in vertically downward alignment therebetween, in the main housing 11. The diaphragm valves 6, 7 are arranged in series in the longitudinal direction 13 in the main housing 11, between the brake pressure inlet 3 and the brake pressure outlet 4, with parallel actuation axes 14, 15 and arrangement of the diaphragms 16, 17 in a common diaphragm plane corresponding largely to the parting plane 10, being clamped between the main housing 11 and the housing cover 12. In contrast, the pilot valves 8, 9 are arranged in the housing cover 12.

According to the invention, the pilot valve 8 of the inlet valve 6 and the pilot valve 9 of the outlet valve 7 are arranged in the longitudinal direction 13 in the housing cover 12, largely centrally above the diaphragms 16, 17 of the inlet valve 6 and the outlet valve 7, and with their actuation axes 18, 19 aligned parallel to the parting plane 10. The housing cover 12 has a central insert 30, which is provided with valve bores 20, 21; 22, 23 and control channels 24, 25, 26; 27, 28, 29 and into which the solenoids 31, 32 and the mechanical components of the pilot valves 8, 9, such as the respective valve core 33, 36, the respective valve armature 34, 37 and the respective valve spring 35, 38, are inserted, said insert being encapsulated externally with a plastic material 39.

In the present case, the two pilot valves 8, 9 are embodied as separate solenoid valves, which are arranged axially parallel and radially adjacent to one another in the insert 30 with opposite switching directions and a valve seat 40, 41 facing the respective diaphragm 16, 17 of the associated inlet or outlet valve 6, 7. Here, the insert 30 consists of a part 42 on the inlet side and a part 43 on the outlet side, which enclose the two solenoids 31, 32 and the mechanical components 33-35; 36-38 of the solenoid valves 8, 9 at the ends. Connection cables 44 of the solenoids 31, 32, which end in a connection socket 45 formed integrally with the encapsulation 39, are laid within the encapsulation 39 of the housing cover 12.

By virtue of their shape, the diaphragms 16, 17 of the inlet valve 6 and of the outlet valve 7 each rest on a valve seat 46, 47 of a cylindrical central channel 48, 49, which, by the supply of a low or high control pressure to a control chamber 50, 51 arranged between the relevant diaphragm 16, 17 and the housing cover 12, can be connected to a cylindrical annular channel 52, 53 arranged coaxially therewith or can be shut off from said channel. The cylindrical annular channel 52 of the inlet valve 6 is connected to the brake pressure inlet 3. The central channel 48 of the inlet valve 6 is connected to the cylindrical annular channel 53 of the outlet valve 7, which is connected, in turn, to the brake pressure outlet 4. The central channel 49 of the outlet valve 7 is connected to the vent outlet 5. The brake pressure outlet 4 can thus either be connected to the brake pressure inlet 3 or shut off from the latter by the inlet valve 6.

The brake pressure outlet 4 can likewise either be connected to the vent outlet 5 or shut off from the latter by the outlet valve 7.

In the embodiment of the valve unit 1.1 according to FIGS. 1 to 3, the insert 30 of the housing cover 12 extends as far as the parting plane 10 between the main housing 11 and the housing cover 12, but delimits the control chambers 50, 51 of the two diaphragm valves 8, 9 only partially. To avoid problems with leaktightness, sealing elements 54, 55, 56, 57 are therefore arranged between the insert 30 and the encapsulation 39 made of plastic material in the housing cover 12, close to the two control chambers 50, 51. The sealing elements 54, 55, 56, 57 may be designed as sealing strips which are inserted into transverse grooves in the insert 30 and are encapsulated with the plastic material 33 together with the insert 30.

The valve unit 1.1 according to FIGS. 1 to 3 has the operating functions of "pressure buildup", "pressure maintenance" and "pressure reduction". In the operating function of "pressure buildup" of the valve unit 1.1, the inlet valve 6 is open and the outlet valve 7 is closed, with the result that the brake pressure fed in at the brake pressure inlet 3 via a brake valve is transmitted unchanged to the brake pressure outlet 4 and to at least one wheel brake cylinder connected thereto. Since the operating function of "pressure buildup" corresponds to the state of rest of the valve unit 1.1, the pilot valve 8 of the inlet valve 6 connects the control chamber 50 of the inlet valve 6, via control channel 24, valve bore 21, longitudinal grooves 60 in valve armature 34, and a central bore 59 in valve core 33, to a control channel 25 carrying a low control pressure when the solenoid 31 of said pilot valve is in the deenergized state, said control channel being connected in a manner not shown to the vent outlet 5. In this operating situation, diaphragm 16, which is shown resting against the valve seat 46 of the inlet valve 6 by virtue of its shape in FIG. 1 and FIG. 2, is moved toward the control chamber 50 by a brake pressure present in the annular channel 52, thereby opening the inlet valve 6.

In the deenergized state of the solenoid 32 of the pilot valve 9 of the outlet valve 7, said pilot valve likewise connects the control chamber 51 of the outlet valve 7, via control channel 27, valve bore 23, longitudinal grooves 62 in valve armature 37, and a central bore 61 in valve core 36, to a control channel 29 carrying a high control pressure, which is connected via a further control channel 64 arranged in the main housing 11 to the brake pressure inlet 3 (FIG. 2).

In the operating function of "pressure maintenance" of the valve unit 1.1, the inlet valve 6 and the outlet valve 7 are closed, with the result that the brake pressure applied to the brake pressure outlet 4 and the at least one wheel brake cylinder connected thereto is then held constant. To set this operating function, only the pilot valve 8 of the inlet valve 6 is switched over by energizing the solenoid 31 thereof, as a result of which the relevant valve armature 34 is pulled inward axially away from valve seat 40, counter to the return force of valve spring 35. The control chamber 50 of the inlet valve 6 is thereby connected via control channel 24 and valve bore 21 to a control channel 26 carrying the high control pressure, which is connected via a further control channel 63 arranged in the main housing 11 to the brake pressure inlet 3.

In the operating function of "pressure reduction" of the valve unit 1.1 according to FIGS. 1 to 3, the inlet valve 6 is closed and the outlet valve 7 is open, with the result that the brake pressure outlet 4 and the at least one wheel brake cylinder connected thereto are then vented via the vent outlet 5. To set this operating function, both pilot valves 8, 9 are switched over by energizing the solenoids 31, 32 thereof. The energization of the solenoid 32 of the pilot valve 9 associated with the outlet valve 7 pulls the relevant valve armature 37 inward axially away from valve seat 41, counter to the return force of valve spring 38, as a result of which the control chamber 51 of the outlet valve 7 is connected via control channel 27 and valve bore 23 to a control channel 28 carrying the low control pressure, which is connected in a manner not shown to the vent outlet 5.

The operating functions of "pressure maintenance" and "pressure reduction" of the valve unit 1.1 are antilock functions, by which braking-induced locking of the at least one associated wheel is avoided. These operating functions are controlled by corresponding control of the pilot valves 8, 9 by a control unit of an antilock system, in which the signals from wheel speed sensors are evaluated to detect imminent or already existing locking of the braked wheels.

By virtue of the recumbent arrangement of both pilot valves 8, 9, i.e. arrangement parallel to the parting plane 10 of the valve housing 2 in the longitudinal direction 13, in the installed position of the valve unit 1.1, the overall height of the valve cover 12 is very low and hence the dimensions of the overall valve unit 1.1 are particularly compact. This is particularly advantageous since such valve units 1.1 are arranged as close as possible to the associated wheel brake cylinders in order to achieve a short response time in the relevant wheel brakes when controlling the antilock functions, and the installation space available there is generally small.

By virtue of the alignment of the solenoid valves 8, 9 with valve seats 40, 41 arranged adjacent to the diaphragms 16, 17 or to the control chambers 50, 51 of the associated diaphragm valves 6, 7, particularly small pilot volumes to which air is to be admitted or from which it is to be released when switching over are obtained for both pilot valves 8, 9. This advantageously results in particularly short switching response times of the diaphragm valves 6, 7 when switching over the solenoid valves 8, 9.

By virtue of the encapsulation 39 of the insert 30 containing the solenoids 31, 32 and the mechanical components 33-35, 36-38 of the pilot valves 8, 9, the assembly of the valve unit 1.1 and inspection thereof, during which, in particular, the diaphragms 16, 17 of the diaphragm valves 6, 7 are replaced by new ones, are significantly simplified. Moreover, with the encapsulation 39 of the insert 30, the connection socket 45 of the solenoids 31, 32 can be arranged flexibly, i.e. with a different socket shape and a different alignment if required, at various locations on the housing cover 12 in accordance with the requirements of the respective vehicle manufacturer.

Figure 4:
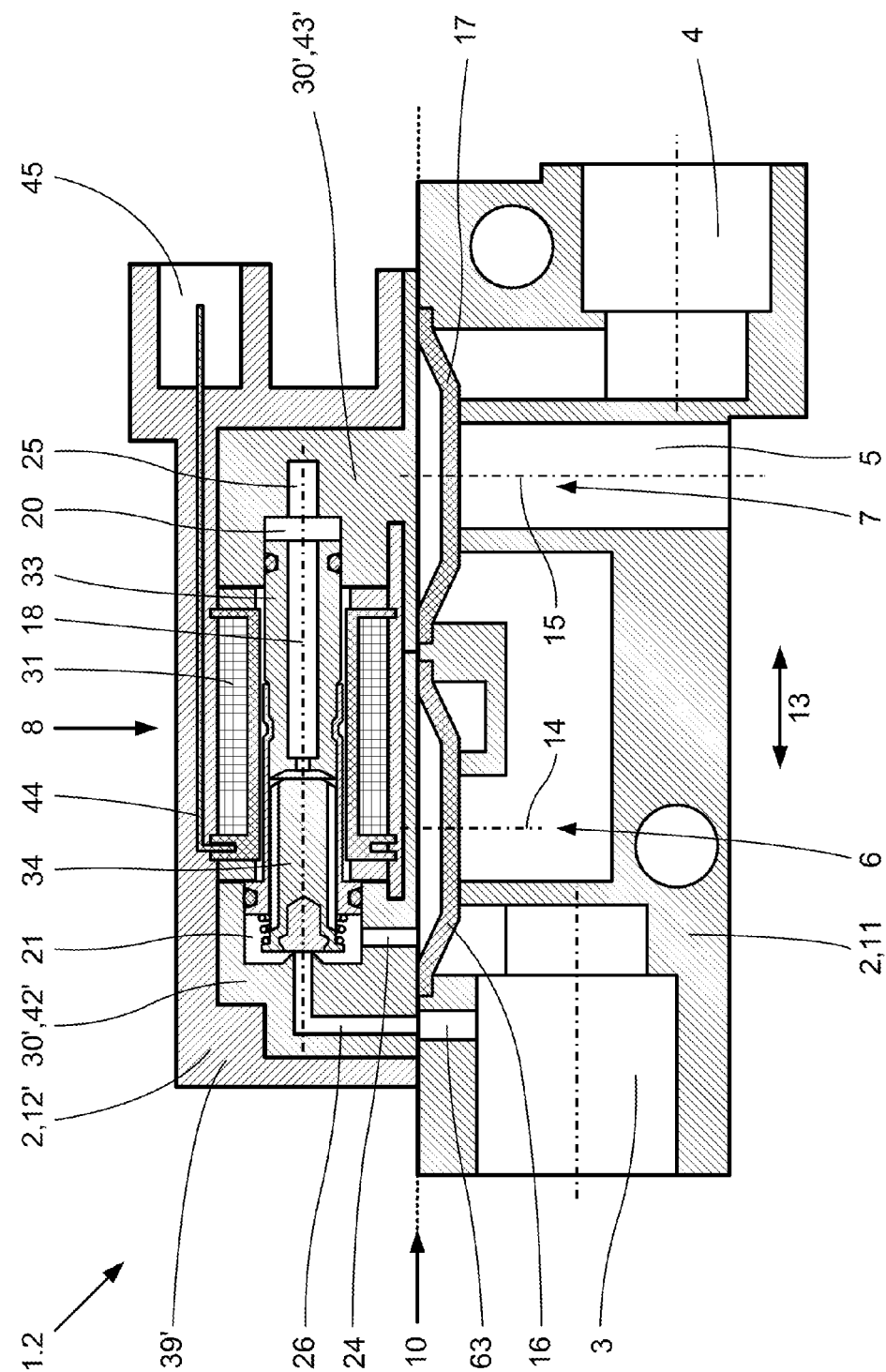
FIG. 4 shows a second embodiment of the valve unit in a first vertical longitudinal section.
Figure 5:
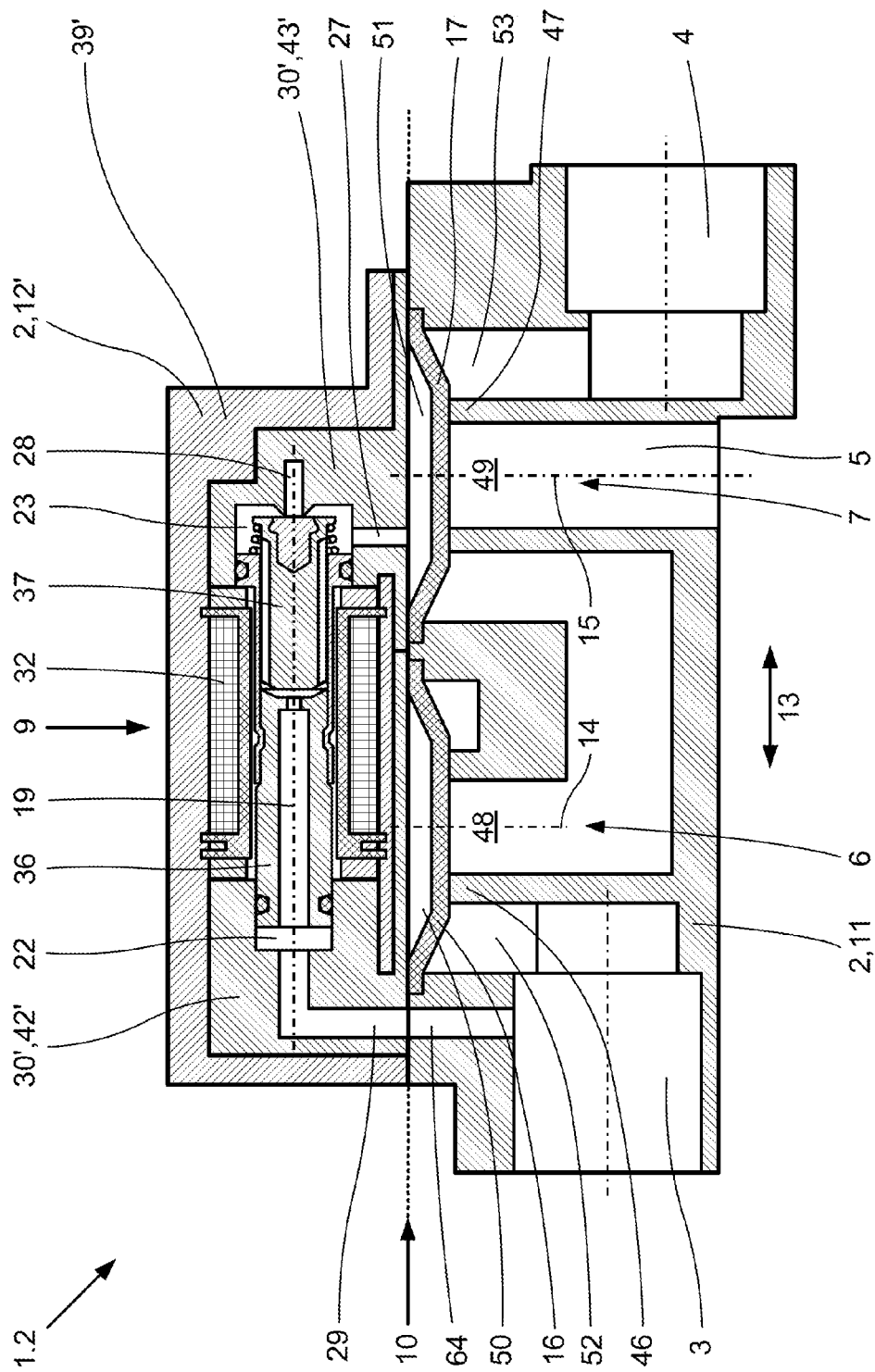
FIG. 5 shows the second embodiment of the valve unit in a second vertical longitudinal section.

A second embodiment of the valve unit 1.2, which is depicted in a first vertical longitudinal section, comparable with that in FIG. 1, in FIG. 4 and in a second vertical longitudinal section, comparable with that in FIG. 2, in FIG. 5, largely corresponds to the first embodiment of the valve unit 1.1 according to FIGS. 1 to 3. One difference between the second embodiment of the valve unit 1.2 and the first embodiment is that the insert 30' or parts 42', 43' thereof, said insert extending in the housing cover 12' as far as the parting plane 10 of the valve housing 2, delimits/delimit the control chambers 50, 51 of the diaphragm valves 6, 7, fully covering said chambers. As a result, it is advantageously possible to dispense with the sealing elements 54, 55, 56, 57 provided between the insert 30 and the encapsulation 39 in the first embodiment according to FIGS. 1 to 3.

Figure 6:
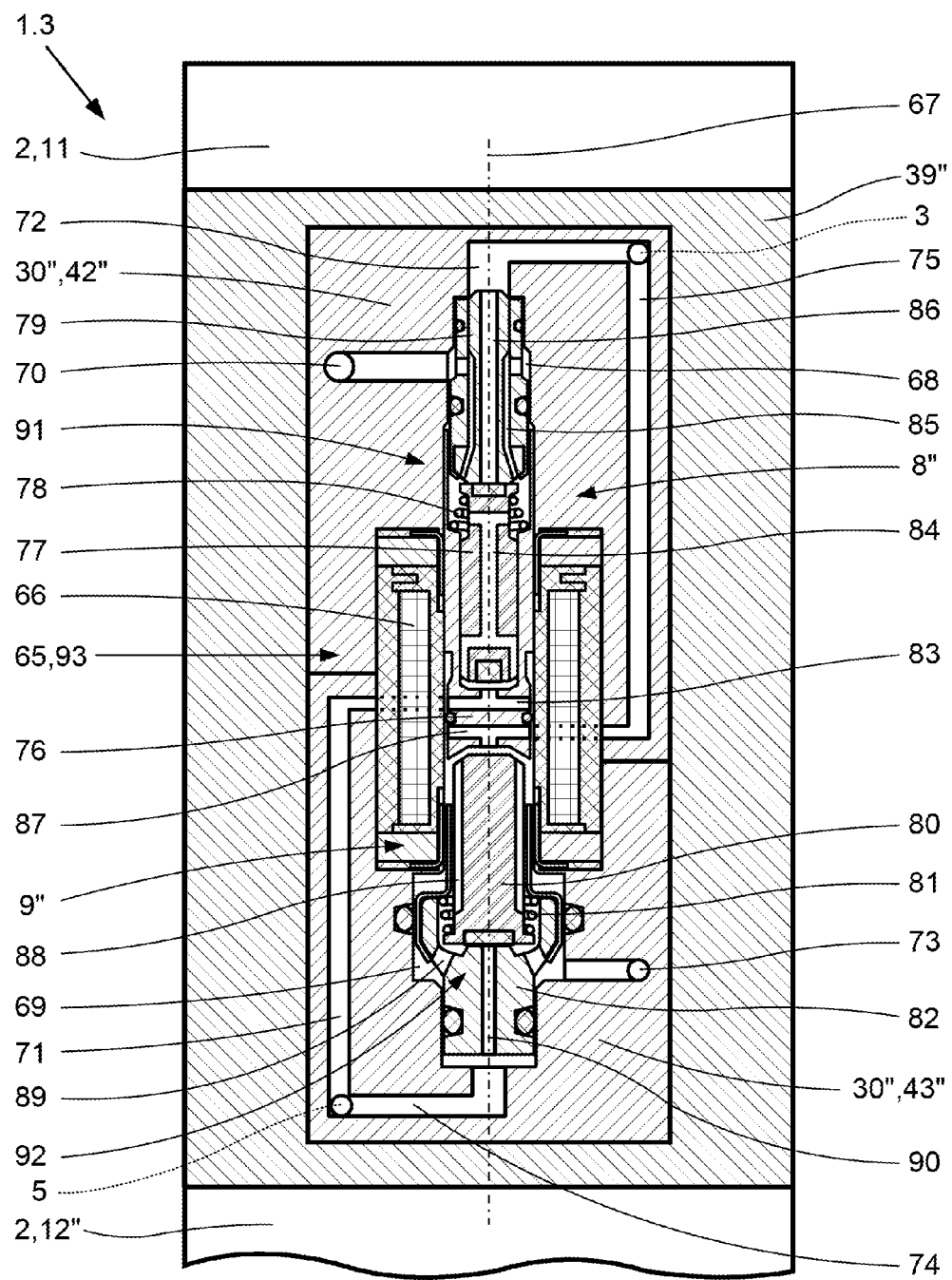
FIG. 6 shows a third embodiment of the valve unit in a horizontal section.

A third embodiment of the valve unit 1.3 according to the invention, which is depicted in FIG. 6 in a horizontal section comparable with that of FIG. 3, has the same mode of operation but differs from the first embodiment of the valve unit 1.1 according to FIGS. 1 to 3 and from the second embodiment of the valve unit 1.2 according to FIGS. 4 and 5 in that the two pilot valves 8'', 9'' are now combined in one double armature solenoid valve 65 having a common solenoid 66. Within the double armature solenoid valve 65, individual solenoid valves 8'', 9'' are arranged coaxially and axially adjacent to one another in the insert 30'' with opposite switching directions and a valve seat 91, 92 in each case facing the respective diaphragm 16, 17 of the associated inlet or outlet valve 6, 7.

In the operating function of "pressure buildup" of the valve unit 1.3, in which the inlet valve 6 is open and the outlet valve 7 is closed, when the solenoid 66 is in the deenergized state the pilot valve 8'' of the inlet valve 6 connects the control chamber 50 of the inlet valve 6, via a control channel 70, valve bore 68, longitudinal grooves 85 arranged in an outer valve core 79, radial and central bores 84 arranged in the associated valve armature 77, and radial and central bores 83 arranged in a central valve core 76, to a control channel 71 carrying a low control pressure, which is connected to the vent outlet 5. In the deenergized state of the solenoid 66, the pilot valve 9'' of the outlet valve 7 likewise connects the control chamber 51 of the outlet valve 7, via control channel 73, valve bore 69, diagonal bores 89 arranged in an outer valve core 82, longitudinal grooves 88 arranged in the associated valve armature 80, and radial and central bores 87 arranged in the central valve core 76, to a control channel 75 carrying a high control pressure, which is connected to the brake pressure inlet 3.

In the operating function of "pressure maintenance" of the valve unit 1.3, in which the inlet valve 6 and the outlet valve 7 are closed, only the pilot valve 8'' of the inlet valve 6 is switched over by energizing the solenoid 66 with a low current or, where there is a central pickoff on the solenoid 66, by partially energizing the solenoid coil 66. In this case, the valve armature 77 of the pilot valve 8'' is pulled inward axially away from valve seat 91, counter to the return force of the relevant valve spring 78. The control chamber 50 of the inlet valve 6 is thereby connected via control channel 70, valve bore 68, the longitudinal grooves 85 arranged in outer valve core 79, and a central bore 86 to a control channel 72 carrying the high control pressure, which is connected to the brake pressure inlet 3 together with the control channel 75 of pilot valve 9''.

In the operating function of "pressure reduction" of the valve unit 1.3, in which the inlet valve 6 is closed and the outlet valve 7 is open, both pilot valves 8'', 9'' are switched over by energizing the solenoid 66 with a high current or, where there is a central pickoff on the solenoid 66, by fully energizing the solenoid 66. During the process of switching over the pilot valve 9'' associated with the outlet valve 7, the associated valve armature 80 is pulled inward axially away from valve seat 92, counter to the return force of the relevant valve spring 81. As a result, the control chamber 51 of the outlet valve 7 is connected via control channel 73, valve bore 69, the diagonal bores 89 arranged in outer valve core 82, and a central bore 90 to a control channel 74 carrying the low control pressure, which is connected to the vent outlet 5 together with the control channel 71 of pilot valve 8''.

The staged actuation of the two pilot valves 8'', 9'' is achieved by an appropriately low spring stiffness of the valve spring 78 of the pilot valve 8'' associated with the inlet valve 6 and an appropriately high spring stiffness of the valve spring 81 of the pilot valve 9'' associated with the outlet valve 7.

To facilitate assembly and improve the functioning of the two pilot valves 8'', 9'', the mechanical components of the double armature solenoid valve 65, such as the central valve core 76, the valve armatures 77, 80, the valve springs 78, 81 and the outer valve cores 79, 82 are assembled in a valve cartridge 93 in the present case by way of example, said cartridge being inserted at the end into a respective valve bore 68, 69 of the part 42'' of the insert 30'' on the inlet side and of the part 43'' of the insert 30'' on the outlet side.

While the above description constitutes the preferred embodiments of the present invention, it will be appreciated that the invention is susceptible to modification, variation and change without departing from the proper scope and fair meaning of the accompanying claims.

What is claimed is:

1. A valve unit (1.2; 1.2, 1.3) for modulating pressure in a pneumatic brake system, the valve unit comprising:
   a brake pressure inlet (3),
   a brake pressure outlet (4),
   a vent outlet (5),
   an inlet valve (6) configured as a first diaphragm valve having a first diaphragm,
   an outlet valve (7) configured as a second diaphragm valve having a second diaphragm, and
   a pilot valve (8, 9; 8'', 9'') configured as a 3/2-way solenoid valve associated with each of the first and second diaphragm valves (6, 7), the first and second diaphragm valves being arranged in an elongate valve housing (2), wherein the elongate valve housing (2) is subdivided into a main housing (11) and a housing cover (12, 12', 12") by a parting plane (10), which is substantially horizontal in an installed position, wherein the brake pressure inlet (3), the brake pressure outlet (4), and the vent outlet (5) are arranged in the main housing (11), the diaphragm valves (6, 7) are arranged in series in a longitudinal direction (13) in the main housing (11) between the brake pressure inlet (3) and the brake pressure outlet (4) with parallel actuation axes (14, 15), wherein the first and second diaphragms (16, 17) are arranged in a common diaphragm plane corresponding substantially to the parting plane (10) and are clamped between the main housing (11) and the housing cover (12), wherein the pilot valves (8, 9; 8", 9") are arranged in the housing cover (12, 12', 12"), in the longitudinal direction (13) in the housing cover (12, 12', 12"), substantially centrally above the first diaphragm and the second diaphragm (16, 17) of the inlet valve (6) and the outlet valve (7) respectively, and with their actuation axes (18, 19; 67) aligned parallel to the parting plane (10), and wherein the housing cover (12, 12', 12") has a central insert (30, 30', 30") having a plurality of valve bores (20-23; 68, 69) and a plurality of control channels (24-29; 70-75) and into which a solenoid (31, 32; 66) of each of the solenoid valves and a plurality of mechanical components (33-38; 76-82) of the pilot valves (8, 9; 8", 9") are inserted, the insert being encapsulated with a plastic material (39, 39', 39").

2. The valve unit as claimed in claim 1, wherein the pilot valves (8, 9) are solenoid valves arranged axially parallel and radially adjacent to one another in the central insert (30, 30') with opposite switching directions and each of the pilot valves having a valve seat (40, 41) facing the diaphragm (16, 17) of the associated inlet valve or outlet valve (6, 7).

3. The valve unit as claimed in claim 2, wherein the central insert (30, 30') includes a first insert part and a second insert part (42, 43; 42', 43'), which enclose the solenoids (31, 32) and a plurality of mechanical components (33, 34, 35, 36, 37, 38) of each of the solenoid valves (8, 9) at a first end and a second end of the central insert.

4. The valve unit as claimed in claim 3, wherein the plurality of mechanical components (33, 34, 35, 36, 37, 38) of each of the solenoid valves (8, 9) are each assembled in a valve cartridge (93).

5. The valve unit as claimed in claim 1, wherein the pilot valves (8", 9") are combined in a double armature solenoid valve (65) having a common solenoid (66), in which the individual solenoid valves (8", 9") are arranged coaxially and axially adjacent to one another in the central insert (30") with opposite switching directions and each having a valve seat (91, 92) facing the respective diaphragm (16, 17) of the associated inlet valve or outlet valve (6, 7).

6. The valve unit as claimed in claim 5, wherein the common solenoid (66) of the double armature solenoid valve (65) is configured to be energized with a low current and a high current, and wherein the pilot valves (8", 9") are configured in such a way that the solenoid valve (8") associated with the inlet valve (6) is switched over by energization of the common solenoid (66) with the low current, whereas the solenoid valve (9") associated with the outlet valve (7) is switched over only when the common solenoid (66) is energized with the high current.

7. The valve unit as claimed in claim 5, wherein the common solenoid (66) of the double armature solenoid valve (65) has a central pickoff for partial energization, and wherein the pilot valves (8", 9") are configured in such a way that the solenoid valve (8") associated with the inlet valve (6) is switched over by partial energization of the common solenoid (66), whereas the solenoid valve (9") associated with the outlet valve (7) is switched over only by full energization of the common solenoid (66).

8. The valve unit as claimed in claim 5, wherein the central insert (30") includes two parts (42", 43"), which enclose the common solenoid (66) and a plurality of mechanical components (76, 77, 78, 79, 80, 81, 82) of the double armature solenoid valve (65) at a first end and a second end of the double armature solenoid valve.

9. The valve unit as claimed in claim 8, wherein the plurality of mechanical components (76, 77, 78, 79, 80, 81, 82) of the double armature solenoid valve (65) are assembled in a valve cartridge (93).

10. The valve unit as claimed in claim 1, wherein the central insert (30) of the housing cover (12) extends to the parting plane (10) of the elongate valve housing (2) and at least partially delimits a first control chamber and a second control chamber (50, 51) of the first and second diaphragm valves (6, 7), respectively.

11. The valve unit as claimed in claim 10, wherein a plurality of sealing elements (54-57) are arranged in the housing cover (12) between the central insert (30) and the encapsulating plastic material (39), at least near the first and second control chambers (50, 51) of the solenoid valves (6, 7).

12. The valve unit as claimed in claim 1, wherein the central insert (30') of the housing cover (12') extends to the parting plane (10) of the valve housing (2) and delimits a first control chamber and a second control chamber (50, 51) of the first and second diaphragm valves (6, 7), the central insert fully overlapping the control chambers.

13. The valve unit as claimed in claim 1, wherein connection cables (44) of the solenoids (31, 32), which end in a connection socket (45) formed integrally with the encapsulating plastic material (39, 39'), are laid within the encapsulating plastic material (39, 39') of the housing cover (12, 12').

14. The valve unit as claimed in claim 1, wherein the brake pressure inlet (3) and the brake pressure outlet (4) are arranged substantially axially opposite in horizontal alignment in the longitudinal direction (13), and the vent outlet (5) in vertically downward alignment therebetween, in the main housing (11).

* * * * *